United States Patent [19]

Teramachi

[11] Patent Number: 4,681,506

[45] Date of Patent: Jul. 21, 1987

[54] TABLE FEED APPARATUS

[76] Inventor: Hiroshi Teramachi, 2-34-8, Higashi-Tamagawa, Setagaya-ku, Tokyo, Japan

[21] Appl. No.: 876,810

[22] Filed: Jun. 20, 1986

[30] Foreign Application Priority Data

Jun. 21, 1985 [JP] Japan ................................ 60-133999

[51] Int. Cl.$^4$ ............................................. B65G 25/00
[52] U.S. Cl. .................................... 414/749; 104/290; 254/105
[58] Field of Search ................. 414/749, 750; 105/32; 104/290; 254/105, 106; 198/619, 750

[56] References Cited

U.S. PATENT DOCUMENTS

| | | | |
|---|---|---|---|
| 3,767,064 | 10/1973 | Lutz ............................... | 198/750 X |
| 3,821,934 | 7/1974 | Maeda ............................ | 254/105 X |
| 4,014,266 | 3/1977 | Naslund et al. ................ | 254/105 X |
| 4,458,808 | 7/1984 | Loomer .......................... | 414/749 X |
| 4,627,362 | 12/1986 | Ise et al. ......................... | 104/290 X |

Primary Examiner—Robert J. Spar
Assistant Examiner—Jay I. Alexander
Attorney, Agent, or Firm—Kenyon & Kenyon

[57] ABSTRACT

A table feed apparatus is disclosed. The table feed apparatus includes a fixed bed, a first movable table and a second movable table. The first movable table and the second movable table are carried on the fixed bed through the first and second linear bearings in such a manner that the tables are vertically separated from each other and are movable in the same direction. The first and second movable tables have a brake for fixing the tables to the fixed bed. The apparatus further includes a linear motor acting between the first and the second movable tables and capable of selectively causing one of the tables to travel while the other is fixed to the fixed bed through its brake. In consequence, it is possible for the movable tables to travel an infinitely long distance, irrespective of the length of the fixed member.

8 Claims, 20 Drawing Figures

TABLE FEED APPARATUS

BACKGROUND OF THE INVENTION

1. Field of the Invention

The present invention relates to a table feed apparatus which is applied to a machine tool or the like.

2. Description of the Prior Art

Table feed apparatus have heretofore been known in which a movable table is slideably carried by a fixed bed. In general, the feed mechanism for driving the movable table is constituted by a combination of a ball screw and nut assembly and rotary motors such as servo motors, stepping motors or the like, and the rectilinear motion of the movable table is normally controlled by utilizing the rotary motion of the ball screw and nut assembly, thereby effecting high precision positioning of the movable table. However, such a conventional type of apparatus suffers from a problem in that, due to the backlash of the ball screw and nut assembly, the starting and stopping response characteristics are undesirably impaired in such a way that it is difficult to precisely control the position of the movable table. If the ball screw and nut assembly is arranged to have a small pitch in order to attain high precision positioning, the speed of feed of the apparatus unavoidably slows down. It is also to be pointed out that the size of the apparatus as a whole is increased due to the need to mount thereon the ball screw and nut assembly and rotary motors.

In order to overcome these problems, various proposals have been made with respect to table feed apparatus employing a linear motor. The arrangement which incorporates a linear motor is effective in that the response of movement of the movable table is superior and the table can be fed at high speed due to the elimination of a driving-force transmission mechanism employing mechanical means such as a ball screw and nut assembly. Furthermore, the arrangement is effective in that the size of the apparatus can be decreased since the linear motor has a movable member and a fixed member interposed between the movable table and the fixed bed.

However, the above-described conventional type of table feed apparatus which includes a linear motor is normally arranged in such a manner that the movable table travels on the fixed member secured to the fixed bed, so that the range in which the movable table can travel is limited within the range corresponding to the entire length of the fixed member. For this reason, in order to enable the movable table to travel a long distance, it is necessary to prepare a long fixed member. On the other hand, since teeth on the fixed member are formed through the etching of a steel sheet or the like, if the fixed member is to be increased in length, the etching bath employed must be lengthened accordingly, thus leading to an increase in the scale of the production facility and in production costs. Thus, the prior art involves difficulties in that the length of the etching bath is generally limited, and, as the fixed member per se becomes longer, the production cost is increased. In order to solve these problems, one method has been considered in which a plurality of short fixed members are jointed so as to form a long fixed member. However, in this method, it is difficult to unite the joints of the short fixed members with high precision exactly the same as the pitch of the fixed teeth. For example, even if the movable member is arranged to travel at 1 mm pitch, when the member passes over each joint it tends to run over the joint at speeds substantially corresponding to 1.5 mm pitch or less than 1 mm pitch since each pitch as defined by the adjacent joints is prone to be varied producing irregular lengths such as 1.5 mm or less than 1 mm rather than the normal dimension of 1 mm. This disadvantage raises certain problems such as the deterioration of the precision with which the movable table travels.

SUMMARY OF THE INVENTION

Accordingly, a primary object of the present invention is to provide a table feed apparatus capable of travelling an infinite distance, irrespective of the length of the fixed member employed and including, for example, even a distance longer than the entire length of the fixed member, and of carrying out precise feeding of a movable table.

To this end, the present invention provides a table feed apparatus comprising a fixed bed, a first movable table mounted through first linear bearing means on said bed for movement in a direction relative to said bed, a second movable table mounted through second linear bearing means on said bed in a vertically space relation with said first movable table for movement in the same direction in which said first movable table is movable relative to said bed, first brake means attached to said first movable table for selectively placing said first movable table into a fixed or movable relation to said bed, second brake means attached to said second movable table for selectively placing said second movable table into a fixed or movable relation to said bed, and a linear motor A disposed between said first and second movable tables for driving said first and second movable tables to move relative to each other when one of said first and second movable tables is fixed to said bed by the associated one of said first and second brake means while the other table is freely movable.

The above and other objects, features and advantages of present invention will become clear from the following description of the preferred embodiment, when the same is read in conjunction with the accompanying drawings.

DESCRIPTION OF THE PREFERRED EMBODIMENT

A preferred embodiment of the table feed apparatus of this invention will be explained hereinunder with reference to the accompanying drawings.

Referring to FIGS. 1 to 6 showing a linear motor constituting part of an embodiment of this invention, a fixed bed 1 has flanges 2, 2 at each breadthwise side thereof and the flanges 2, 2 are so formed as to protrude upright from the sides and to extend parallel with each other in the longitudinal direction. Guide rails 3, 3 are secured to the fixed bed 1 through fixing means 4 (such as bolts) and are disposed parallel with the inner surfaces of the flanges 2, 2 opposing each other. A first movable table 5 and a second movable table 6 are carried on the guide rails 3, 3 through linear bearings later described for free movement along the length of each of the guide rails 3, 3. Specifically, recesses for mounting the linear bearings are formed in the opposing side surfaces of the underside of the second movable table 6, and a pair of linear bearings 7, 7 are respectively secured to the recesses on both sides through fixing means 8. Another pair of linear bearings 9, 9 are respectively secured through fixing means 10 to both sides of the leading and trailing end portions of the upper surface of the first movable table 5. A couple of loaded-ball rolling grooves 3a, 3a are respectively formed in the side surfaces of the guide rails 3, 3 adjacent to the first and second movable tables 5, 6 in such a manner as to guide loaded-balls 22 (shown in FIG. 8) incorporated in each of the above-described linear bearings 7, 9. Therefore, the first and second movable tables 5, 6 are guided by the same guide rails 3, 3 through each of the linear bearings 7, 9 secured to both tables, so that the second movable table 6 is relatively moved with respect to the first movable table 5. Furthermore, the second movable table 6 is arranged to travel with respect to the first movable table 5 within the range defined between the linear bearings 9, 9 mounted on the breadthwise side surfaces of the leading and trailing ends of the first movable table 5. A linear motor A is interposed between the first movable table 5 and the second movable table 6 and a fixed member 5' of the linear motor A is mounted on the upper surface of the first movable table 5. On the other hand, a movable member 6' is mounted on the underside of the second movable table 6 facing the upper surface of the movable table 5.

Figure 7:
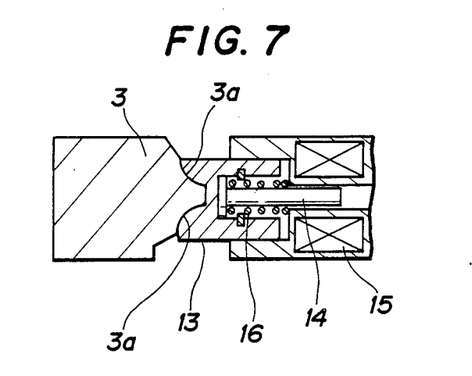
FIG. 7 is a longitudinal sectional view showing the essential portion of an electromagnetic brake incorporated in the apparatus show in FIG. 1.

As a pair of brake means, an electromagnetic brake means 11 is mounted on each of the central portions of the breadthwise side surfaces of the second movable table 6 which are defined between the linear bearings 7, 7. On the other hand, a pair of electromagnetic brakes 12, 12 are respectively mounted on both sides of the leading and trailing end portions of the upper surface of the first movable table 5. As shown in FIG. 7, each of the electromagnetic brakes 11, 12 comprises a brake shoe 13 which is adapted to be pressed against the corresponding guide rail 3 for a braking operation, a plunger 14 for causing the brake shoe 13 to move back and forth in the direction perpendicular to the guide rail 3, and an electromagnetic coil 15 for actuating the plunger 14. The arrangement is such that while the coil 15 is energized, the plunger 14 is pulled in such a way as to separate the brake shoe 13 from the corresponding guide rail 3, and conversely, while the coil 15 is de-energized, the brake shoe 13 is pushed by a spring 16 and thereby pressed against the corresponding guide rail 3.

Figure 8:
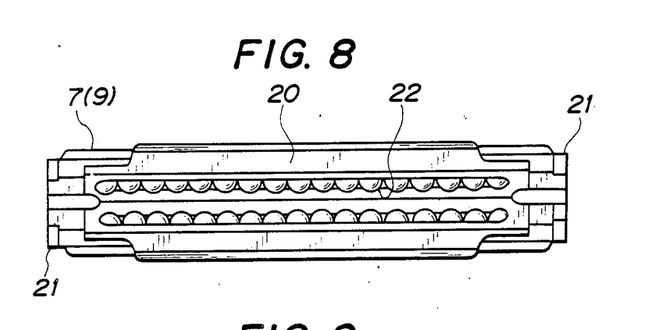
FIG. 8 is a front elevational view of one of the linear bearings incorporated in the apparatus shown in FIG. 1.
Figure 9:
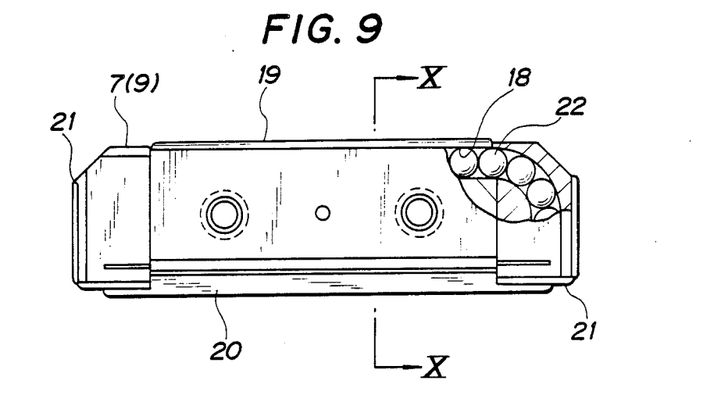
FIG. 9 is a plan view of the apparatus shown in FIG. 8.
Figure 10:
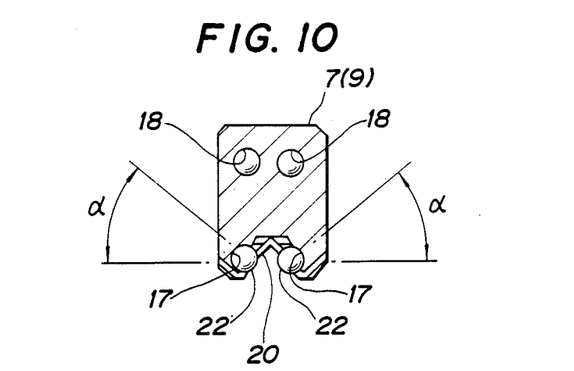
FIG. 10 is a sectional view taken along the line X—X of FIG. 9.

As shown in FIGS. 8 to 10, each of the linear bearings 7, 9 comprises a bearing block 19 provided with two ball-rolling grooves 17, 17 on one side thereof and also with two internal ball-recirculating holes 18, 18; a retainer 20 which retains two loaded-ball trains; and a pair of end plates 21, 21 each of which provides communication between the ball-rolling grooves 17, 17 and the corresponding ball-recirculating holes 18, 18. The loaded balls 22, 22 are arranged to roll and recirculate along endless passages formed by the ball-rolling grooves 17, 17 and the ball-recirculating holes 18, 18. In the illustrated embodiment, the angle $\alpha$ of contact between the ball-rolling grooves 17, 17 and the loaded balls 22, 22 is about 45°. However, this angle is only illustrative and can be selected freely within the range of between 30° and 60°.

Figure 1:
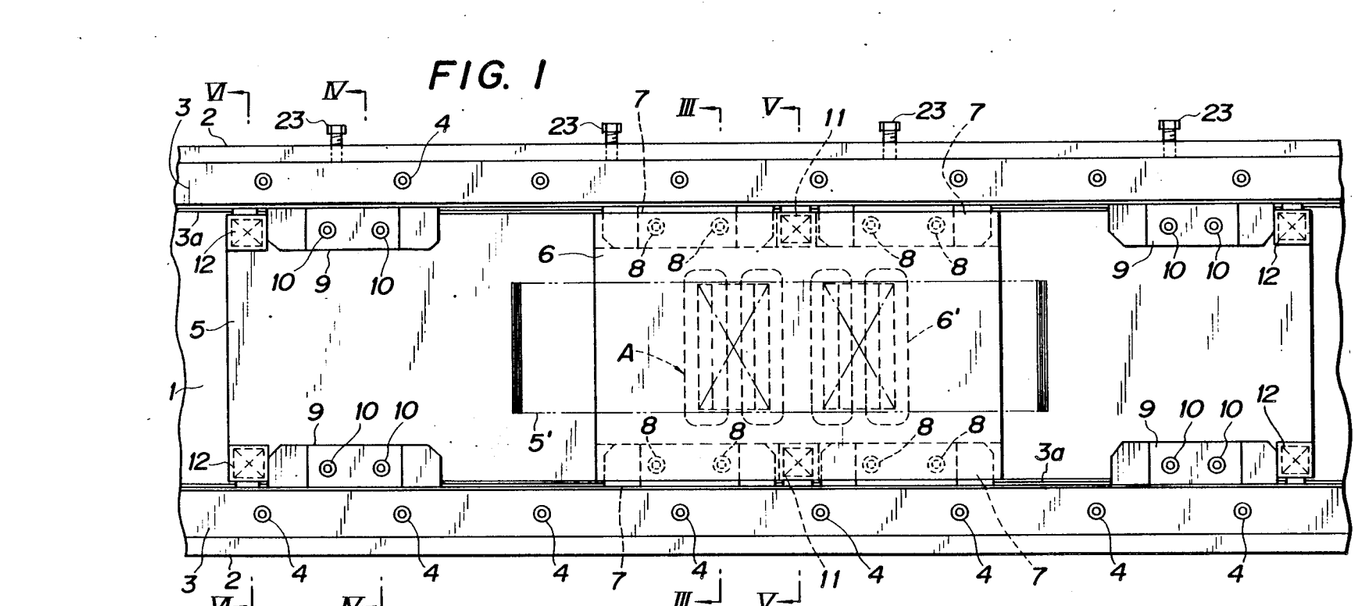
FIG. 1 is a top plan view of a preferred embodiment of a table feed apparatus in accordance with the present invention, partially showing some of the constituent parts in the interior which are not normally visible from the exterior.
Figure 2:
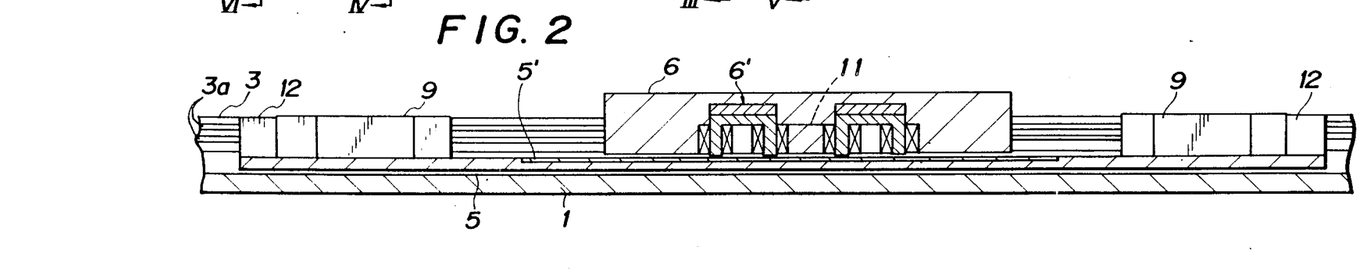
FIG. 2 is a longitudinal sectional view of the apparatus shown in FIG. 1.
Figure 3:
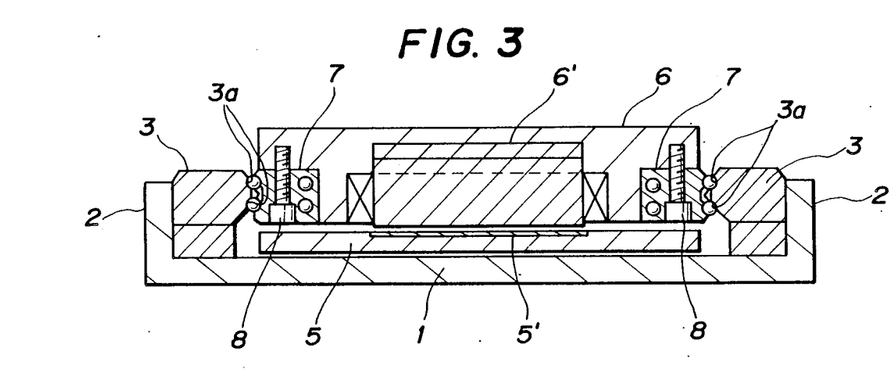
FIG. 3 is a sectional view taken along the line III—III of FIG. 1.
Figure 4:
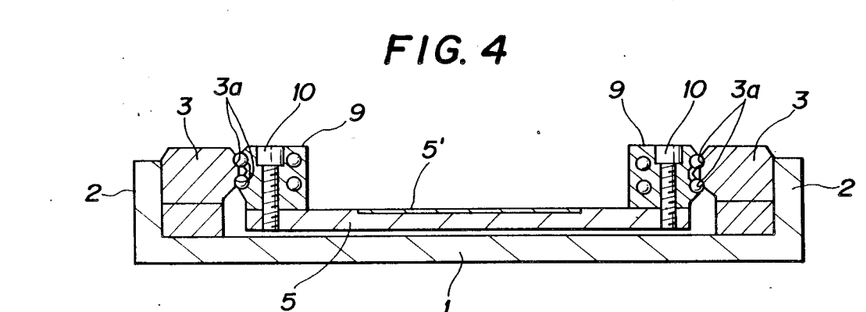
FIG. 4 is a sectional view taken along the line IV—IV of FIG. 1.
Figure 5:
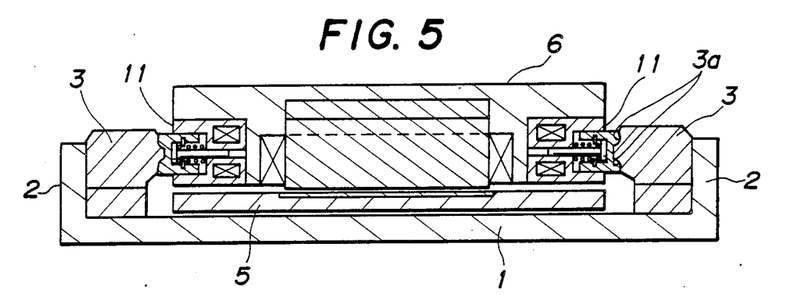
FIG. 5 is a sectional view taken along the line V—V of FIG. 1.
Figure 6:
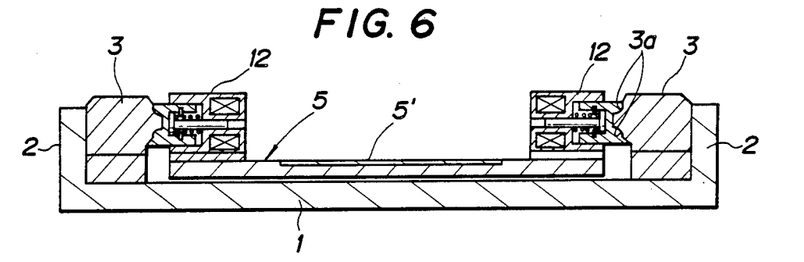
FIG. 6 is a sectional view taken along the line VI—VI of FIG. 1.

As shown in FIG. 1, the clearances between the guide rails 3, 3 and each of the linear bearings 7, 9 are adjustable by means of clearance-adjusting bolts 23, 23 mounted on one of the guide rails 3, 3. Specifically, as the clearance-adjusting bolts 23 are tightened, the inner ends of these bolts 23 press the corresponding bearings 7, 9 in the direction of the other guide rail 3 while the reactional force acting on these bolts is transmitted such as to press the other linear bearings 7, 9, thereby suitably preloading the loaded balls 22. As another preloading method, eccentric pins, taper gibs or the like may be used.

Figure 11:
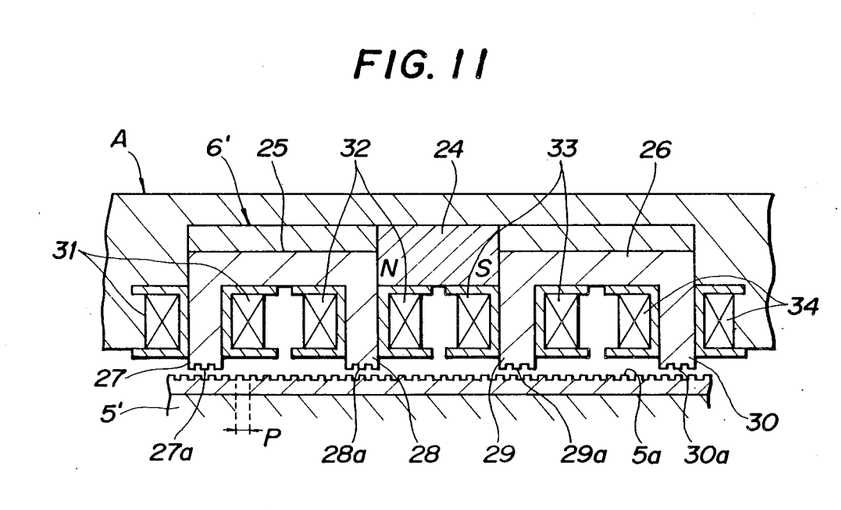
FIG. 11 is an enlarged, sectional view showing the essential portion of the movable member and the fixed member incorporated in the apparatus of this invention.

FIG. 11 shows the essential portion of the linear motor incorporated in this preferred embodiment. In the illustrated embodiment, movable member 6' has a central permanent magnet 24 and left and right magnetic cores 25, 26 disposed to face each other across the central permanent magnet 24. The magnetic core 25 (on the left side as viewed in FIG. 11) has first and second magnetic poles 27, 28 which are magnetized in N polarity by the central permanent magnet 24. The magnetic core 26 (on the right side as viewed in FIG. 11) has third and fourth magnetic poles 29, 30 which are magnetized in S polarity by the central permanent magnet 24.

As shown in FIG. 11, a multiplicity of fixed teeth 5a, each having a rectangular cross-section and extending in the direction substantially perpendicular to the longitudinal direction of the fixed member 5' are formed over the entire length of fixed member 5' at a constant pitch P. The first to fourth magnetic poles 27 to 30 are provided with pole teeth 27a to 30a at the same pitch as the teeth on the fixed member 5'.

The first and second magnetic poles 27, 28 of N polarity carry, respectively, first and second coils 31, 32 wound thereon. These coils 31, 32 are connected in series such that they produce magnetic fluxes of counter-directions when electric pulse current is supplied to these coils from pulse generating means (not shown) electrically connected to these coils 31, 32.

Similarly, the third and fourth magnetic poles 29, 30 of S polarity carry, respectively third and fourth coils 33, 34 wound thereon. These coils 33, 34 are connected in series such that they produce magnetic fluxes of counter-directions when electric pulse current is supplied to these coils from the pulse generating means (not shown) electrically connected to these coils 33, 34. For the sake of simplicity of explanation, it is assumed that the phase of the pole teeth 28a of the second magnetic pole 28 is offset from the phase of the pole teeth 27a of the first magnetic pole 27 by an amount corresponding to ½ pitch, i.e., P/2, and the phase of the pole teeth 29a of the third magnetic pole 29 is offset from the phase of the pole teeth 30a of the fourth magnetic pole 30 by an amount corresponding to ½ pitch, i.e., P/2. It is also assumed that the pole teeth 29a, 30a of the third and fourth magnetic poles 29, 30 of S polarity are offset in phase from the pole teeth 27a, 28a of the first and second magnetic poles 27, 28 of N polarity by an amount corresponding to ¼ pitch, i.e., P/4.

The principle of operation of the linear pulse motor incorporated in this embodiment will be explained with specific reference to FIGS. 12A to 12D which schematically illustrate the operation of this linear pulse motor.

Figure 12A:
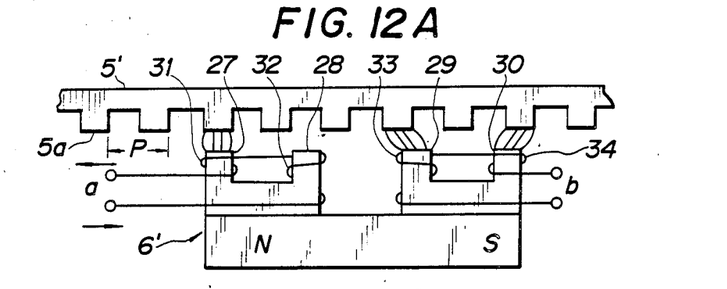
FIGS. 12A to 12D are diagrammatic front elevational views of the linear pulse motor, showing the principle of operation thereof.
Figure 12B:
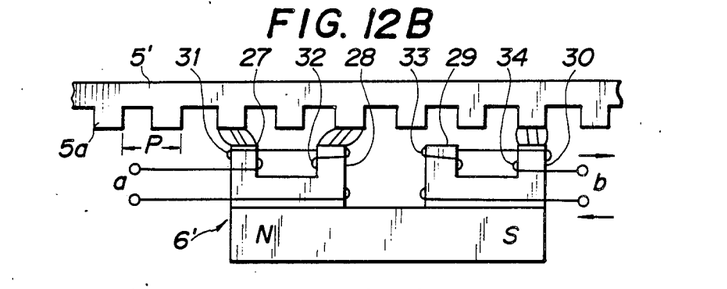
Figure 12C:
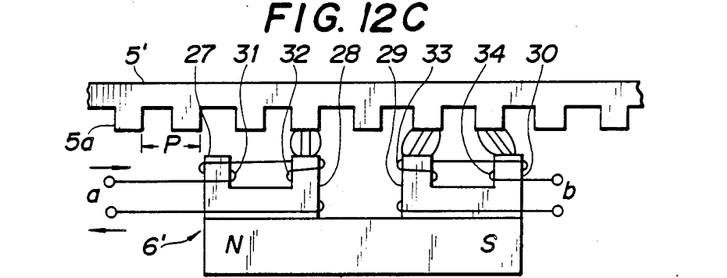

The arrangement is such that the first and second coils 31, 32 receive pulses through terminals a, while the third and fourth coils 33, 34 receive pulses thorugh terminals b. In FIG. 12A, the pulse current is supplied to the terminals a in such a direction as to excite the first magnetic pole 27 (Mode (1)). In shown in FIG. 12B, the pulse current is supplied to the terminals b in such a direction as to excite the fourth magnetic pole 30 (Mode (2)). As shown in FIG. 12C, the pulse current is supplied to the terminals a in such a direction as to excite the second magnetic pole 28 (Mode (3)). Finally, in FIG. 12D, the pulse current is supplied to the third magnetic pole 29 in such a direction as to excite the third magnetic pole 29 (Mode (4)).

The conditions of the magnetic force generated by each magnetic pole in Modes (1) to (4) are shown in Table 1 below.

TABLE 1

| Mode | Magnetic force generating conditions | Stable position |
|---|---|---|
| (1) | First pole 27: flux from magnet 24 + flux from coil 31<br>Second pole 28: flux from magnet 24 − flux from coil 32 = 0<br>Third and fourth poles 29, 30: magnetic forces by magnet 24 balanced | First pole 27 |
| (2) | First and second poles 27, 28: magnetic forces by magnet 24 balanced<br>Third pole 29: flux from magnet 24 − flux from coil 33 = 0<br>Fourth poles 30: flux from magnet 24 + flux from coil 34 | Fourth pole 30 |
| (3) | First pole 27: flux from magnet 24 − flux from coil 31 = 0<br>Second pole 28: flux from magnet 24 + flux from coil 32<br>Third and fourth poles 29, 30: magnetic forces by magnet 24 balanced | Second pole 28 |
| (4) | First and second poles 27, 28: magnetic forces by magnet 24 balanced<br>Third pole 29: flux from magnet 24 + flux from coil 33<br>Fourth pole 30: flux from magnet 24 − flux from coil 34 | Third pole 29 |

As will seen from Table 1, in Mode (1), the first magnetic pole 27 of N polarity exerts the strongest magnetic force, so that the movable member 6 is held in a stable state by the magnetic attraction force acting between the first magnetic pole 27 and the corresponding tooth 5a of the fixed member 5. On the other hand, the third and fourth magnetic poles 29, 30 of S polarity are offset by ¼ pitch from adjacent teeth 5a on the fixed member 5.

In Mode (2), the magnetic pole 27 does not produce force any more and, instead, the fourth magnetic pole 30 of S polarity produces the strongest force, so that the movable member 6 is relatively moved by a distance corresponding to ¼ pitch, i.e., P/4, such that the fourth magnetic pole 30 comes into phase with the adjacent tooth 5a on the fixed member 5. Meanwhile, the first and second magnetic poles 27, 28 of N polarity are offset from the adjacent tooth 5a on the fixed member 5 by a distance corresponding to ¼ pitch, i.e., P/4.

In Mode (3), the second magnetic pole 28 of N polarity produces the strongest magnetic force, so that the movable member 6 is relatively moved by a distance corresponding to ¼ pitch, i.e., P/4, such that the second magnetic pole 28 comes into phase with the adjacent tooth 5a on the fixed member 5. On the other hand, the third and fourth magnetic poles 29, 30 of S polarity are offset from the adjacent teeth 5a on the fixed member 5 by a distance corresponding to ¼ pitch, i.e., P/4.

Figure 12D:
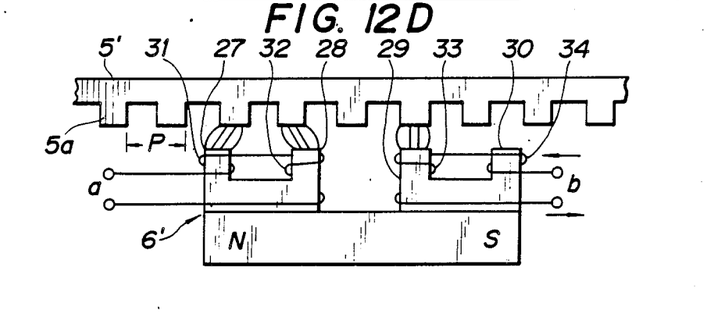

In Mode (4), the third magnetic pole 29 of S polarity exerts the strongest force, so that the movable member 6 is relatively moved by a distance corresponding to ¼ pitch, i.e., P/4, such that the magnetic pole 29 comes into phase with the adjacent tooth 5a on the fixed member 5.

Thereafter, the operation proceeds in Mode (1) again so that the first magnetic pole 27 of N polarity comes to produce the strongest force. As a result, the movable member 6 is further moved by a distance corresponding to ¼ pitch, i.e., P/4, thus resuming the state shown in FIG. 12A. In this way, the movable member 6 travels a distance corresponding to ¼ pitch in each pulse cycle by sequential repetition of Modes (1) to (4).

The foregoing description concerns a single-phase excitation. However, the linear motor incorporated in this invention may be driven by means of the two-phase excitation system which is arranged to be consistently excited by two-phase current. Alternatively, a 1-2 phase excitation system may be adopted in which single-phase and two-phase currents are alternately applied to cause excitation.

The table feed apparatus having the above-described construction is driven in the following manner.

Figure 13A:
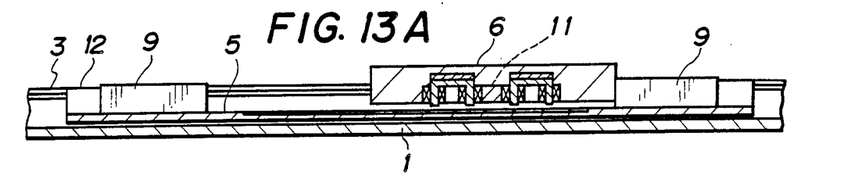
FIGS. 13A to 13E are diagrammatic front sectional views of the apparatus of FIG. 1, showing different steps of operation thereof.
Figure 13B:
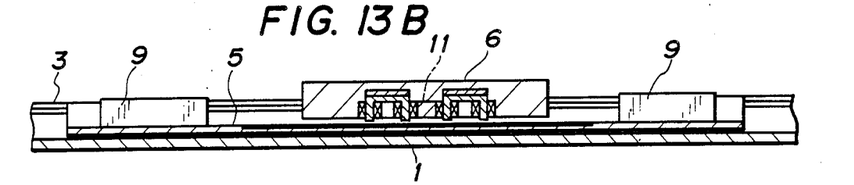
Figure 13C:
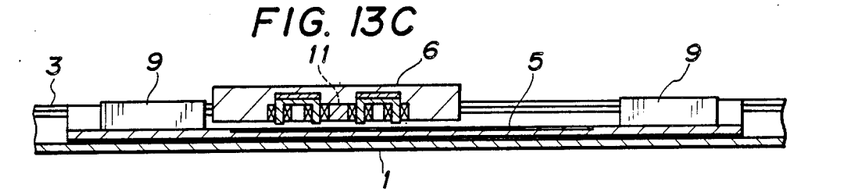
Figure 13D:
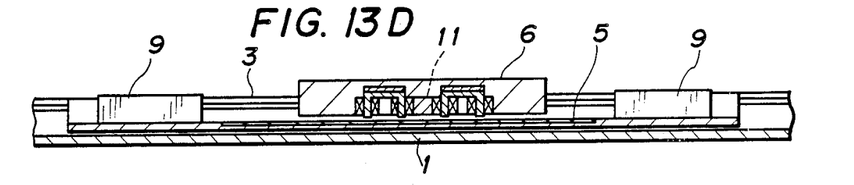
Figure 13E:
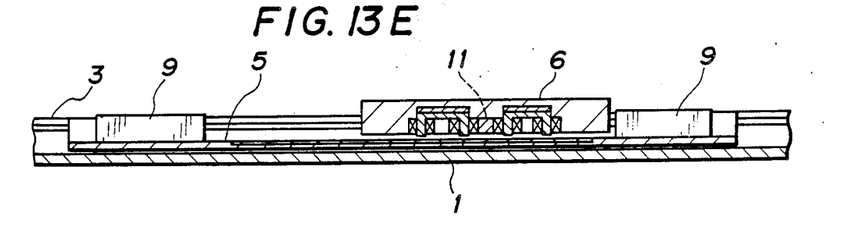

First, each of the electromagnetic brakes 12 of the first moveble table 5 is de-energized so as to release the spring 16 incorporated in each brake 12. The movable table 5 is thereby fixed to the guide rails 3, 3 with a force applied by each spring 16. Simultaneously, both electromagnetic brakes 11 of the second movable table 6 are energized to compress the spring 16 incorporated in each brake 11 such that the movable table 6 is made freely movable with respect to the guide rails 3, 3. In this state, in response to pulse input to the movable member 6', the second movable table is driven to travel forwardly by a predetermined distance as shown in FIGS. 13A, 13B and 13C (leftwardly as viewed in the Figures). After the second movable table 6 has travelled forward the predetermined distance until it stops at a certain point, both electromagnetic brakes 11 of the second movable table 6 are de-energized to release the spring 16 incorporated in each brake 11 such that the movable table 6 is fixed to the guide rails 3, 3 with a force applied by each spring 16. Simultaneously, each of the electromagnetic brakes 12 of the first movable table 5 is energized to compress the spring 16 incorporated in each brake 12 such that the first movable table 5 is made freely movable with respect to the guide rails 3, 3. In this state, pulses are supplied such that the second movable table 6 travels backwardly (rightwardly in FIGS. 13A to 13E). However, since the second movable table 6 is fixed to the guide rails 3, 3, the thus-generated reactional force causes the first movable table 5 to travel forwardly as shown in FIGS. 13C and 13D (leftwardly as viewed in the Figures) and stops at a predetermined position. In the state shown in FIG. 13E, when each of the electromagnetic brakes 12 of the first movable table 5 is de-energized to fix the movable table 5 to the guide rails 3, 3, while both electromagnetic brakes 11 of the second movable table 6 are energized to compress the spring 16 incorporated in each brake 11 such that the second movable table 6 is made freely movable with respect to the guide rails 3, 3. Subsequently, the foregoing operation is repeated, so that the second movable table 6 and the first movable table 5 are alternately caused to travel forwardly (leftwardly as viewed in FIGS. 13A to 13E and to infinitely move along the guide rails 3, 3.

As will be readily understood by those skilled in the art, since the first movable table 5 is fixed by the four electromagnetic brakes 12 mounted on both sides of each of the leading and trailing ends of the movable table 5, a large braking force can be produced. Even when the second movable table 6 displays large inertia due to a heavy load applied thereto, there is no risk of causing slippage between each guide rail 3 and the brake shoe 13 of each electromagnetic brake 12. In addition, the first movable table 5 is fixed to the guide rails 3, 3 at both sides of the leading and trailing ends of the table 5, whereby it is possible to brake the first movable table 5 in a suitably-balanced manner.

As described above, since the first and second movable tables 5,6 are caused to travel through the first and second linear bearings 7,9, respectively, sliding resistance is small, and also, even when a heavy load is applied to the tables 5,6, the tables will smoothly slide without involving high frictional resistance. The use of the first and second linear bearings 7,9 illustratively explained in the description of the embodiment enables the support of a load ten to one hundered times as heavy as a load which could be supported when the first and second linear bearings 7,9 are not used. In addition, if the angle α of contact between the loaded balls 22 of the first and second linear bearings 7,9 and the ball rolling grooves 17,17 is selected to be about 45 degrees, it is possible for the first and second movable tables 5,6 to bear the load equally in all directions, i.e., vertical and lateral directions. Furthermore, suitable rigidity may be realized by suitably preloading the loaded balls 22, so that a constant clearance is maintained between the first movable table 5 and the second movable table 6, thereby assuring stable running performance. Thus, it is possible to prevent such difficulties as pitching in which the travelling pitch is varied, yawing derived from a zigzag operation, and rolling in which each table travels, rotating back and forth.

Although description has been made of and embodiment in which a linear pulse motor driven in response to a pulse signal, it is to be understood that the use of the linear pulse motor is only illustrative and other types of linear motor such as a linear induction motor, a linear d.c. motor and so forth can be used equally well. Also, this embodiment is arranged in such a manner that the fixed member 5' is mounted on the first movable table 5 and the movable member 6' is mounted on the second movable table 6. However, it is a matter of course that this construction is not exclusive and the converse type of construction may also be adopted.

The table feed apparatus of the invention, which has the above-described constitution and effects, offers the following advantages.

The first and second movable tables having respectively brake means, are arranged to be capable of alternately travelling while the other of the movable tables is selectively fixed to the fixed bed, thereby making it possible to travel an infinitely long distance irrespective of the length of the fixed member. Therefore, even in the case of travelling a long distance, it is not necessary to prepare a long fixed member of the type which is necessary in the prior art, thus facilitating production of the table feed apparatus and reducing the production cost. Although the prior art cannot avoid the variation in each of the joints which are formed when a plurality of fixed members are united which leads to the deterioration of the feeding precision of the movable tables, the present invention solves this problem, thus enabling high precision feeding. The use of the linear bearings also eliminates such difficulties as might be caused by variations in travelling pitch (pitching), zigzag travelling (yawing) and lateral floating derived from side-to-side rotation (rolling). Accordingly, the present invention provides a variety of advantages such as stable and smooth running performance.

While the above provides a full and complete disclosure of the invention, various modifications, alternate constructions and equivalents may be employed without departing from the true spirit and scope thereof. The above description and illustrations should not be construed as limiting the scope of the invention, which is defined by the appended claims.

What is claimed is:

1. A table feed apparatus comprising:
   fixed bed;
   a first movable table mounted through first linear bearing means on said bed for movement in a direction relative to said bed;
   a second movable table mounted through second linear bearing means on said bed in a vertically spaced relation with said first movable table for movement in the same direction in which said first movable table is movable relative to said bed;
   first brake means attached to said first movable table for selectively placing said first movable table into a fixed or movable relation to said bed;
   second brake means attached to said second movable table for selectively placing said second movable table into a fixed or movable relation to said bed; and a linear motor disposed between said first and second movable tables for driving said first and second movable tables to move relative to each other when one of said first and second movable tables is fixed to said bed by the associated one of said first and second brake means while the other table is freely movable.

2. A table feed apparatus as claimed in claim 1, wherein said first linear bearing means comprises at least one pair of first linear bearings disposed on the opposite sides of said first movable table, each of said first linear bearings including a guide rail mounted on said bed and a bearing block attached to said first movable table and adapted to move along said guide rail through the intermediary of balls interposed therebetween.

3. A table feed apparatus as claimed in claim 2, wherein said second linear bearing means comprises at least one pair of second linear bearings disposed on the opposite sides of said second movable table, each of said second linear bearings including said guide rail on said bed and a bearing block attached to said second movable table and adapted to move along said guide rail through the intermediary of balls interposed therebetween.

4. A table feed apparatus as claimed in claim 1, wherein said first brake means comprises at least one pair of first brakes disposed in the opposite sides of said first movable table.

5. A table feed apparatus as claimed in claim 4, wherein each of said first brakes comprises an electromagnetically operated brake.

6. A table feed apparatus as claimed in claim 1, wherein said second brake means comprises at least one pair of second brakes disposed on the opposite sides of said second movable table.

7. A table feed apparatus as claimed in claim 6, wherein each of said second brakes comprises an electromagnetically operated brake.

8. A table feed apparatus as claimed in claim 1, wherein said first and second linear bearing means are spaced from each other in the direction in which said first and second movable tables are movable relative to each other.

* * * * *